US012565389B2

(12) United States Patent
Tamakoshi et al.

(10) Patent No.: US 12,565,389 B2
(45) Date of Patent: Mar. 3, 2026

(54) SAMPLE CONVEYANCE SYSTEM AND SAMPLE CONVEYANCE METHOD

(71) Applicant: Hitachi High-Tech Corporation, Tokyo (JP)

(72) Inventors: Takeshi Tamakoshi, Tokyo (JP); Shigeru Yano, Tokyo (JP); Shinji Azuma, Tokyo (JP); Yuichiro Shiga, Tokyo (JP); Daigo Shishido, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 286 days.

(21) Appl. No.: 18/272,323

(22) PCT Filed: Oct. 13, 2021

(86) PCT No.: PCT/JP2021/037955
§ 371 (c)(1),
(2) Date: Jul. 13, 2023

(87) PCT Pub. No.: WO2022/153630
PCT Pub. Date: Jul. 21, 2022

(65) Prior Publication Data
US 2024/0067467 A1 Feb. 29, 2024

(30) Foreign Application Priority Data

Jan. 15, 2021 (JP) ................................ 2021-004652

(51) Int. Cl.
*B65G 54/02* (2006.01)
*G01N 35/04* (2006.01)

(52) U.S. Cl.
CPC ............. *B65G 54/02* (2013.01); *G01N 35/04* (2013.01); *G01N 2035/0477* (2013.01)

(58) Field of Classification Search
CPC . B65G 54/02; G01N 35/04; G01N 2035/0477
See application file for complete search history.

(56) References Cited

U.S. PATENT DOCUMENTS

| 10,962,557 B2 * | 3/2021 | Hoehnel | G01N 35/00732 |
| 10,989,725 B2 * | 4/2021 | Ren | G01N 35/00584 |

(Continued)

FOREIGN PATENT DOCUMENTS

| EP | 4 039 622 A1 | 8/2022 |
| JP | 5-153704 A | 6/1993 |

(Continued)

OTHER PUBLICATIONS

International Search Report (PCT/ISA/210) issued in PCT Application No. PCT/JP2021/037955 dated Dec. 21, 2021 with English translation (4 pages).

(Continued)

*Primary Examiner* — Saul Rodriguez
*Assistant Examiner* — Brendan P Tighe
(74) *Attorney, Agent, or Firm* — Crowell & Moring LLP

(57) ABSTRACT

There are provided a sample conveyance system and a sample conveyance method capable of conveying a sample in a more stable manner than in the related art corresponding to a conveyance method using an electromagnetic actuator. A driving unit 208 applies a first voltage to a first coil 207*a* located on a front side in a traveling direction of a holder 202, which is selected to attract or repel the holder 202, to excite the first coil 207*a* and applies a second voltage having a polarity opposite to a polarity of the first voltage to at least one or more of second coils 207*b* among coils 207 adjacent to the first coil 207*a* except for the coils 207 in the front side in the traveling direction to excite the second coil 207*b*, and a control unit 210A estimates a position of the holder 202 based on a value of a current flowing through a winding 206 of the first coil 207*a*.

10 Claims, 12 Drawing Sheets

(56) References Cited

U.S. PATENT DOCUMENTS

| | | | | |
|---|---|---|---|---|
| 10,996,233 | B2 * | 5/2021 | Hermann | G01N 35/04 |
| 11,110,463 | B2 * | 9/2021 | Huber | B65G 54/025 |
| 11,112,421 | B2 * | 9/2021 | Sinz | B01L 3/502715 |
| 11,772,911 | B2 * | 10/2023 | Aoyama | H02K 1/145 |
| | | | | 198/619 |
| 2014/0234065 | A1 * | 8/2014 | Heise | B65G 54/02 |
| | | | | 414/749.2 |
| 2016/0268883 | A1 | 9/2016 | Kakihara et al. | |
| 2017/0174448 | A1 * | 6/2017 | Sinz | B01L 9/06 |
| 2021/0398723 | A1 * | 12/2021 | Aoyama | H02K 11/225 |
| 2022/0144556 | A1 * | 5/2022 | Aoyama | H02P 6/185 |
| 2022/0252628 | A1 * | 8/2022 | Tamakoshi | G01N 35/04 |
| 2022/0274792 | A1 * | 9/2022 | Tamakoshi | H02P 25/064 |

FOREIGN PATENT DOCUMENTS

| | | |
|---|---|---|
| JP | 2009-131133 A | 6/2009 |
| JP | 2014-532870 A | 12/2014 |
| JP | 2016-171669 A | 9/2016 |
| JP | 2020-106354 A | 7/2020 |
| WO | WO 2020/183890 A1 | 9/2020 |
| WO | WO 2021/002080 A1 | 1/2021 |

OTHER PUBLICATIONS

Japanese-language Written Opinion (PCT/ISA/237) issued in PCT Application No. PCT/JP2021/037955 dated Dec. 21, 2021 (3 pages).
International Preliminary Report on Patentability (PCT/IB/338 & PCT/IB/373) issued in PCT Application No. PCT/JP2021/037955 dated Jul. 27, 2023, including English translation of document C2 (Japanese-language Written Opinion (PCT/ISA/237), filed on Jul. 13, 2023) (5 pages).
Extended European Search Report issued in European Application No. 21919521.1 dated Nov. 28, 2024 (13 pages).

* cited by examiner

[FIG. 1]
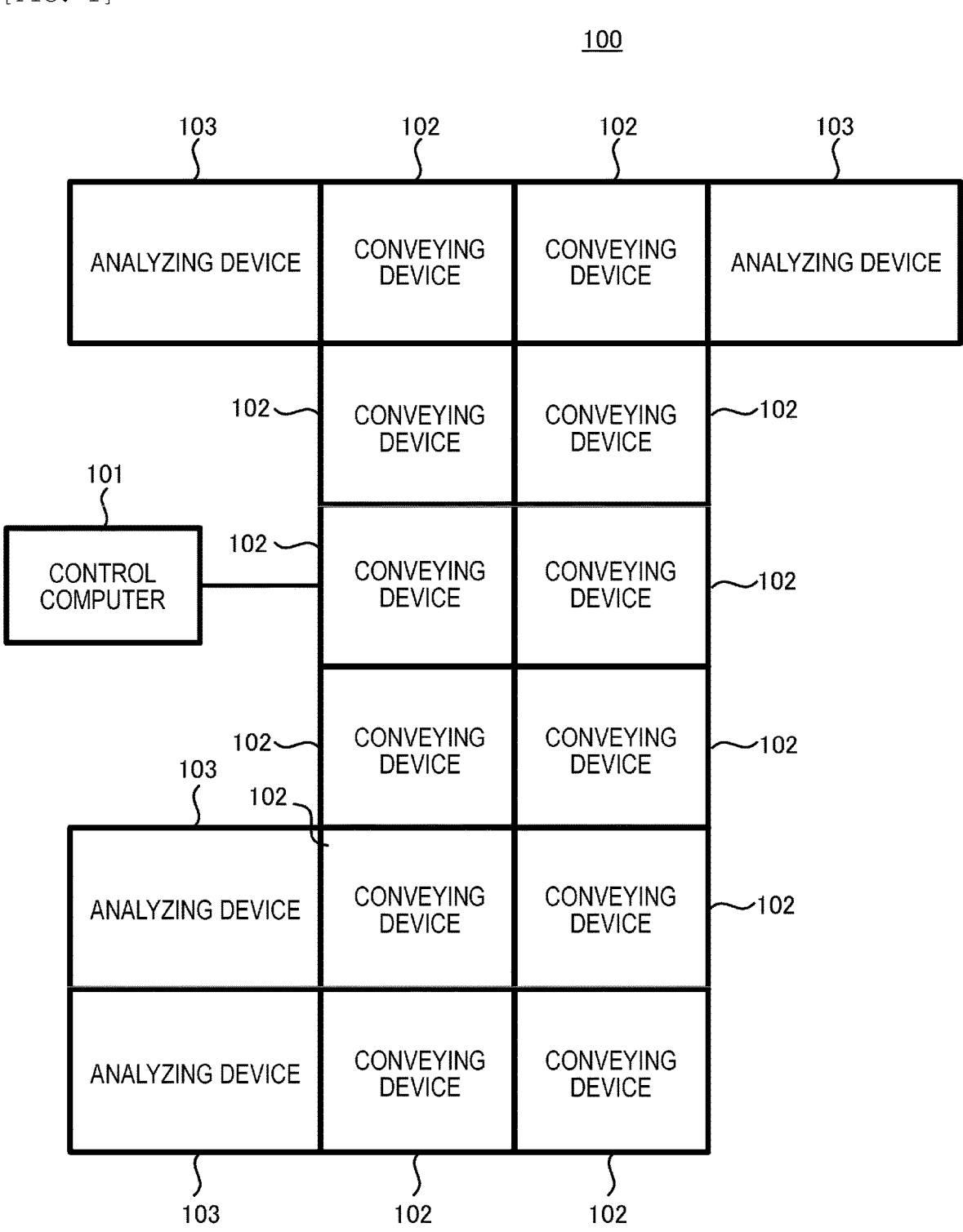

[FIG. 4]
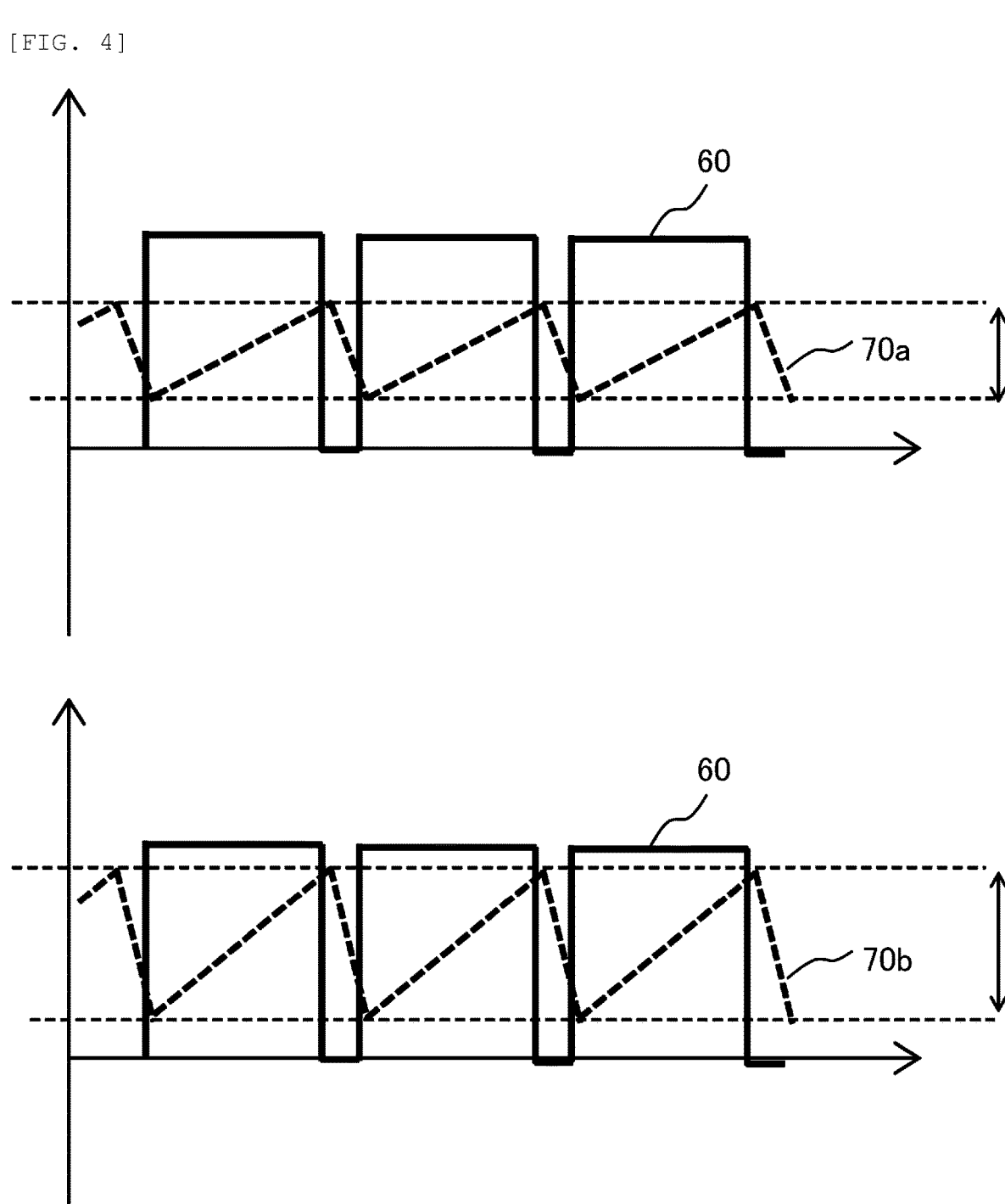

[FIG. 5]
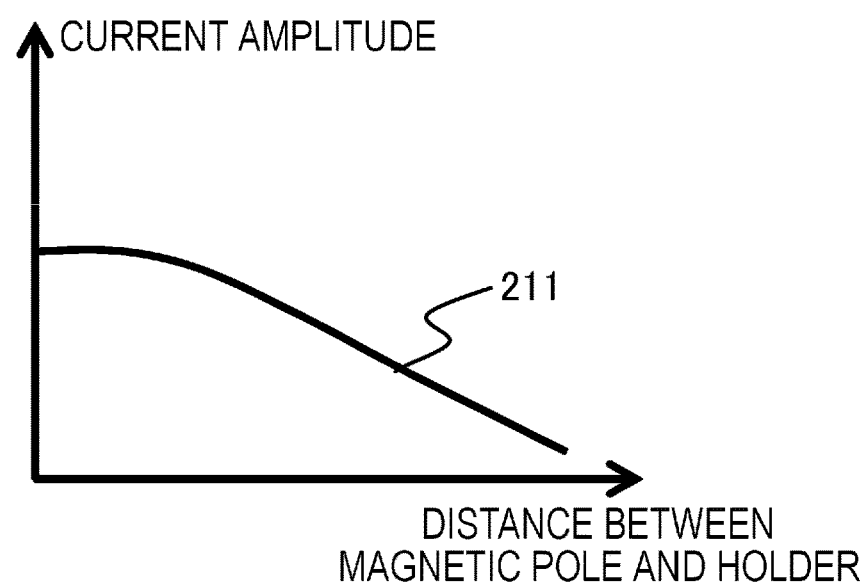
[FIG. 6]
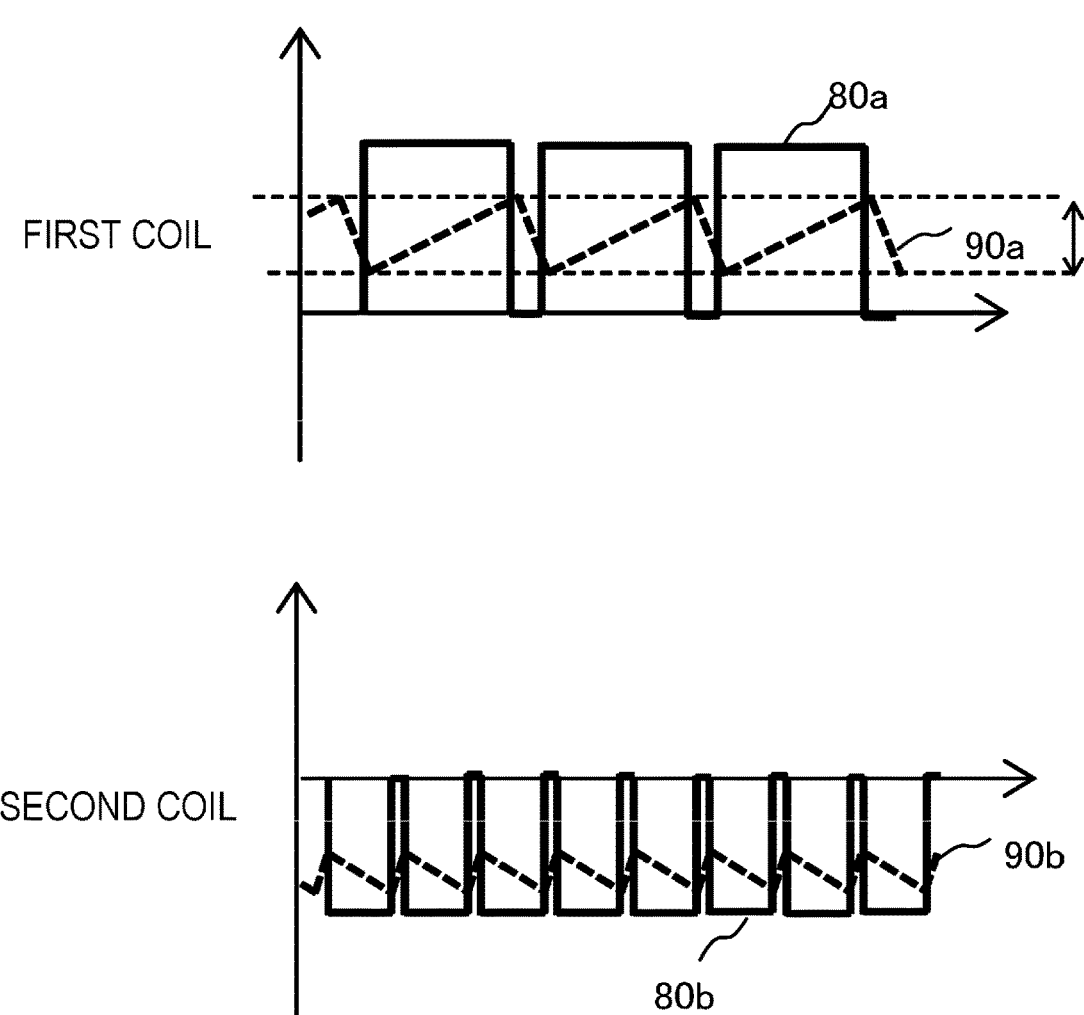

[FIG. 7]
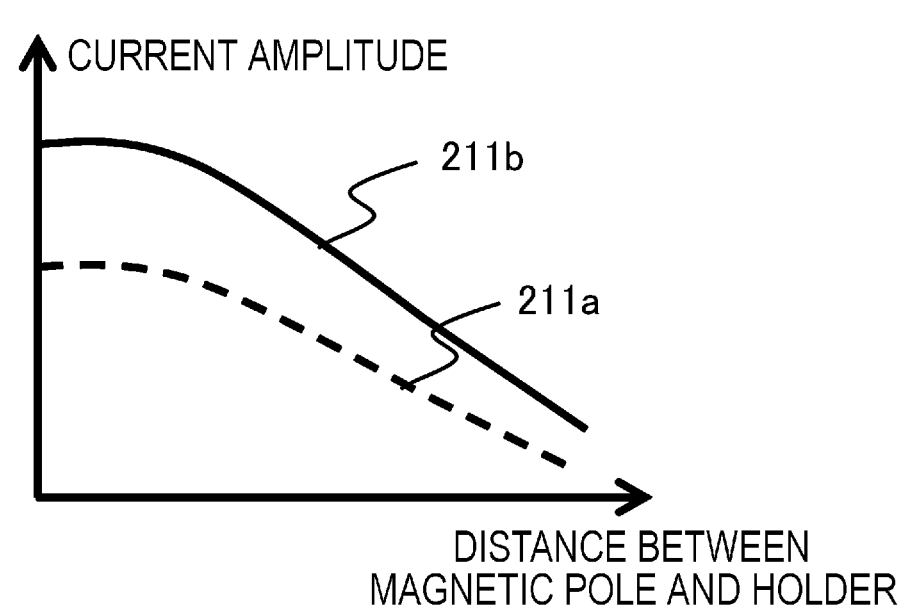

[FIG. 8]
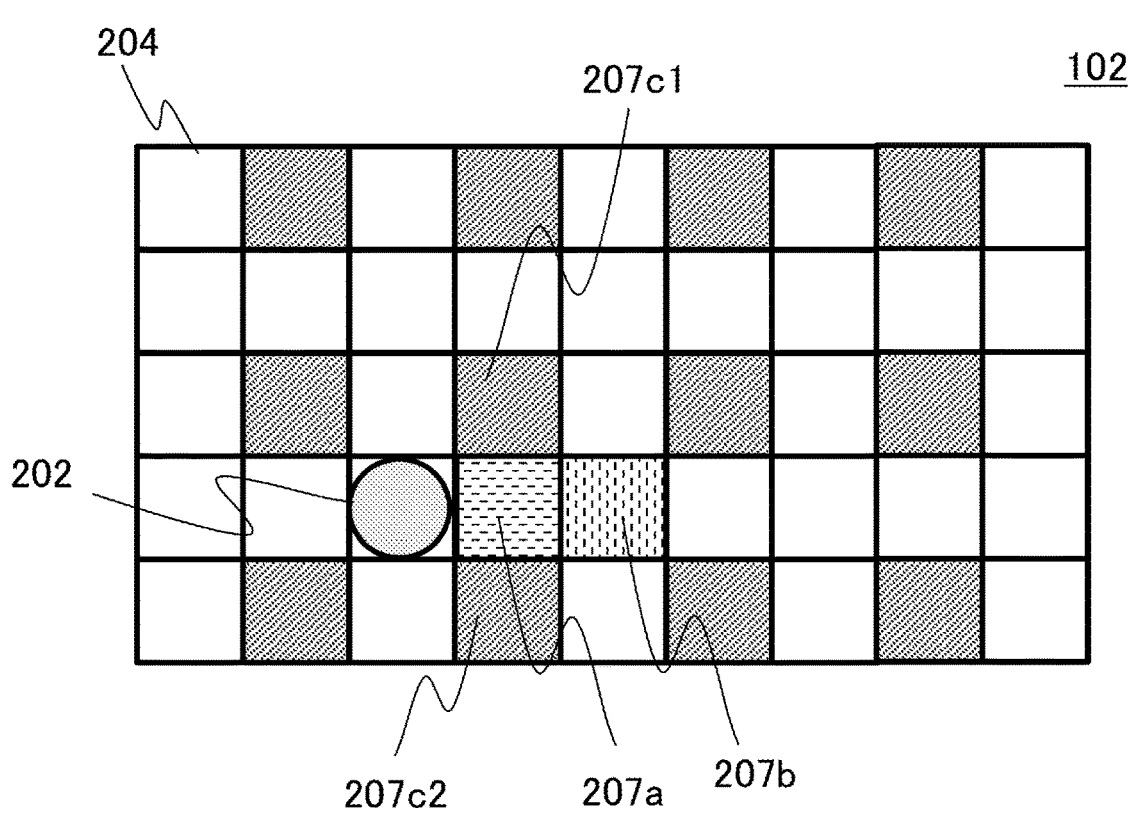
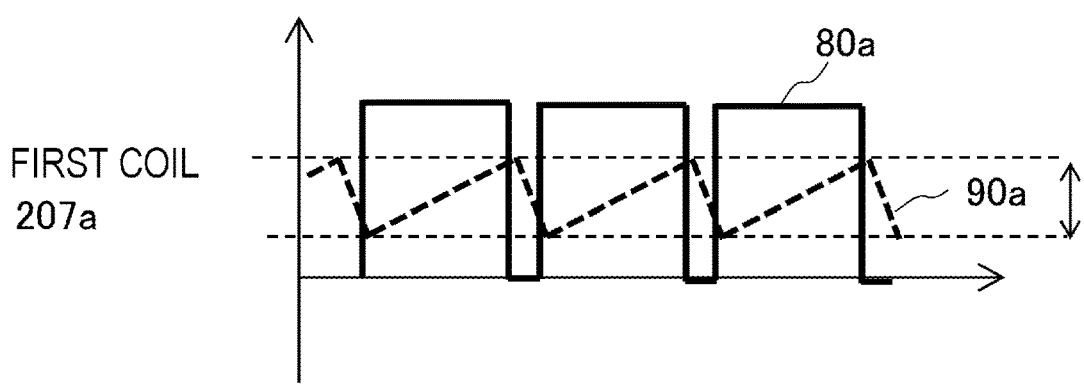
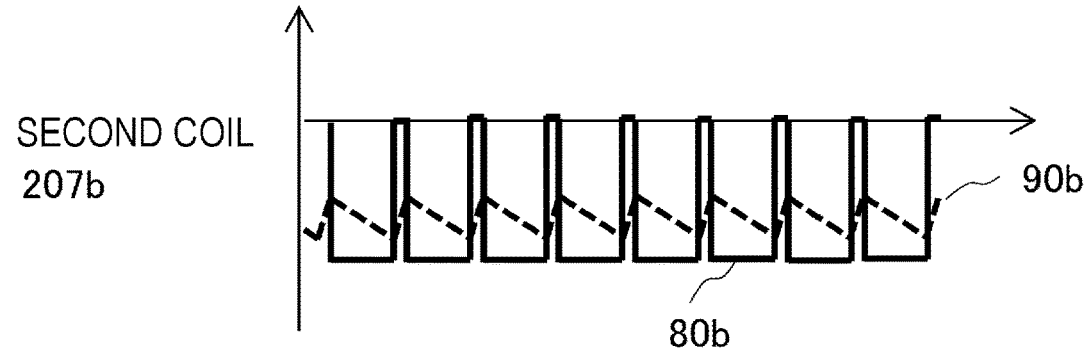

[FIG. 9]
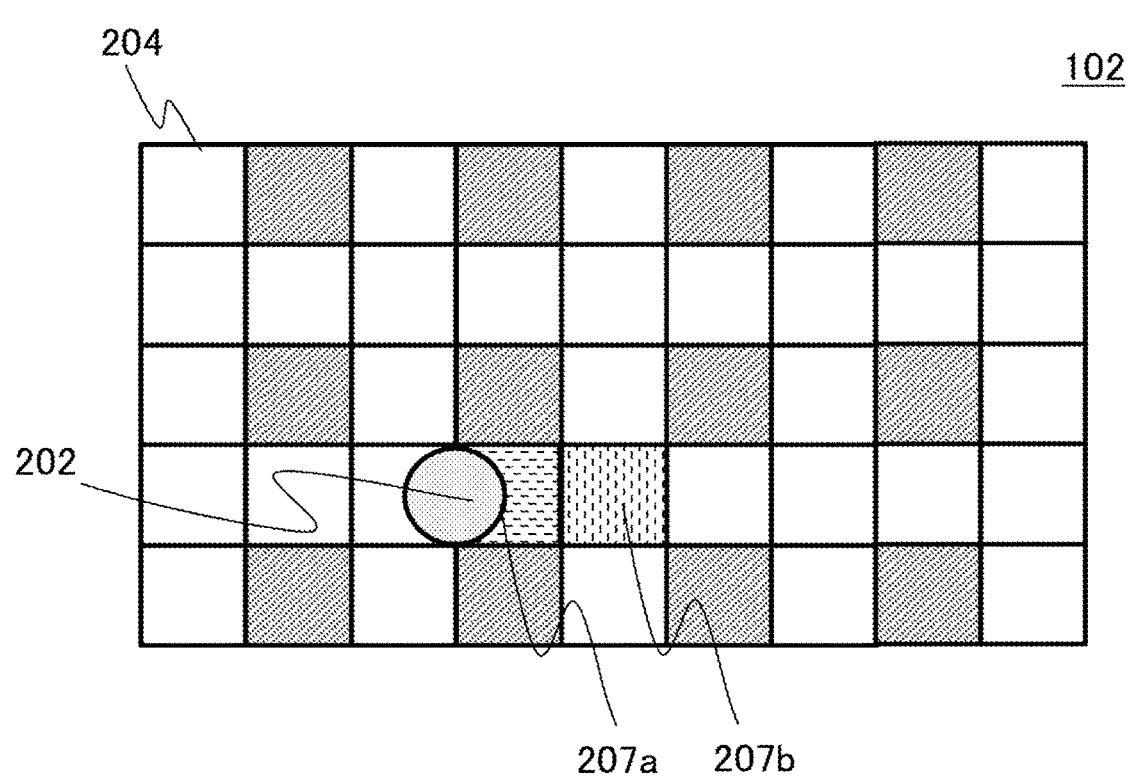
204
202
102
207a    207b
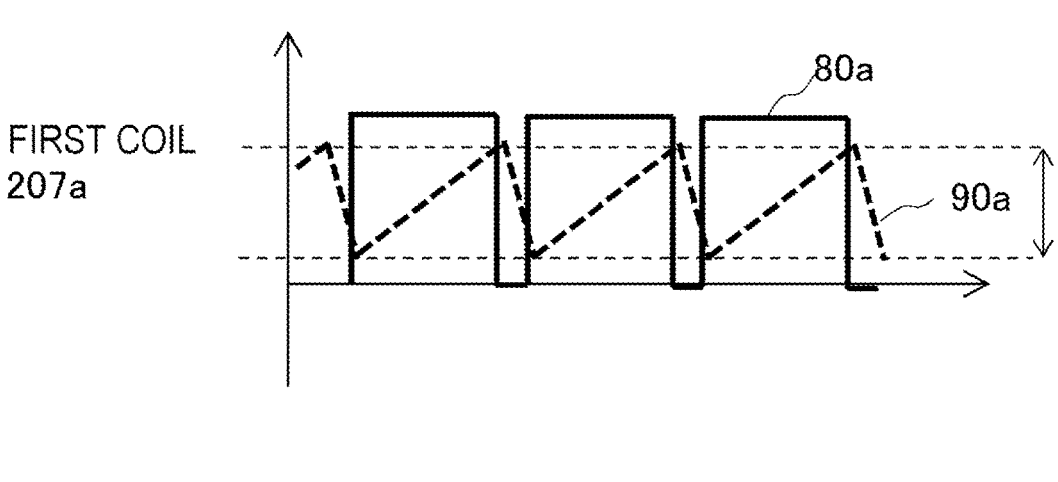
FIRST COIL
207a
80a
90a
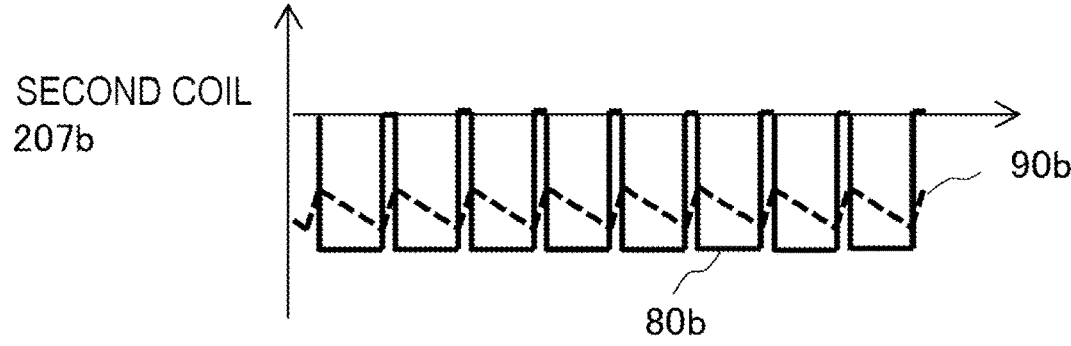
SECOND COIL
207b
90b
80b

[FIG. 10]
204
<u>102</u>
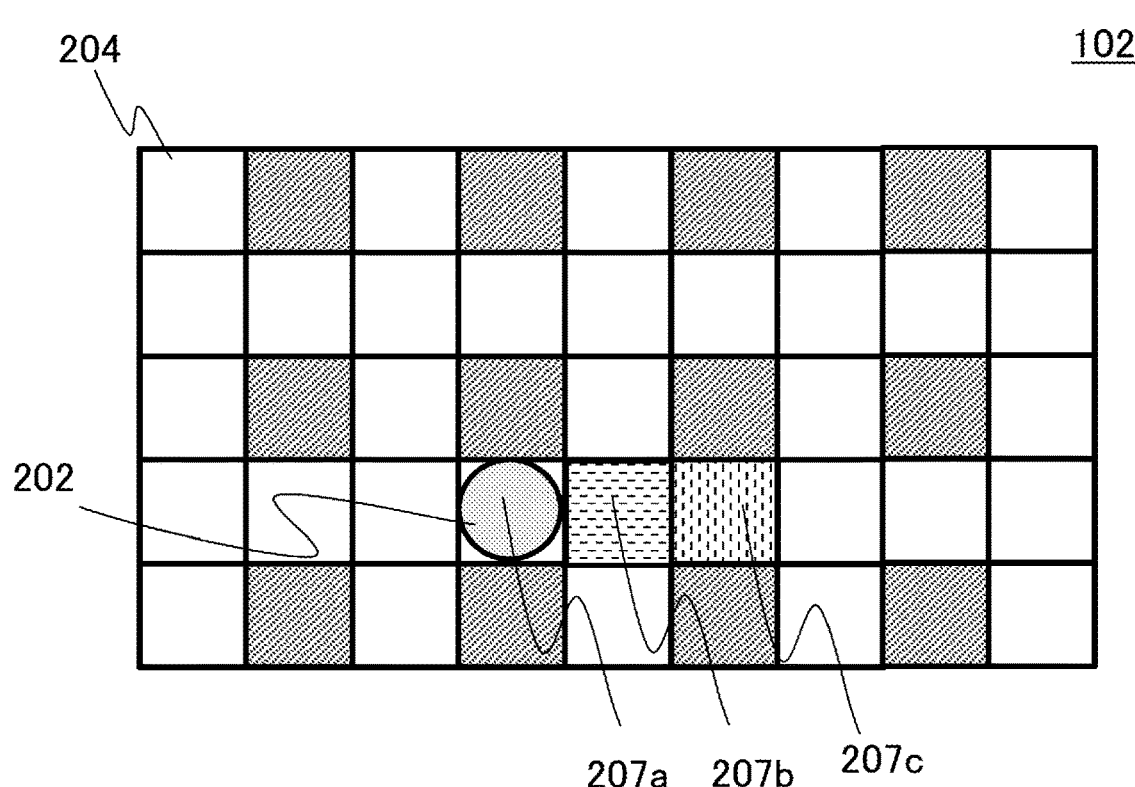
202
207a　207b　207c
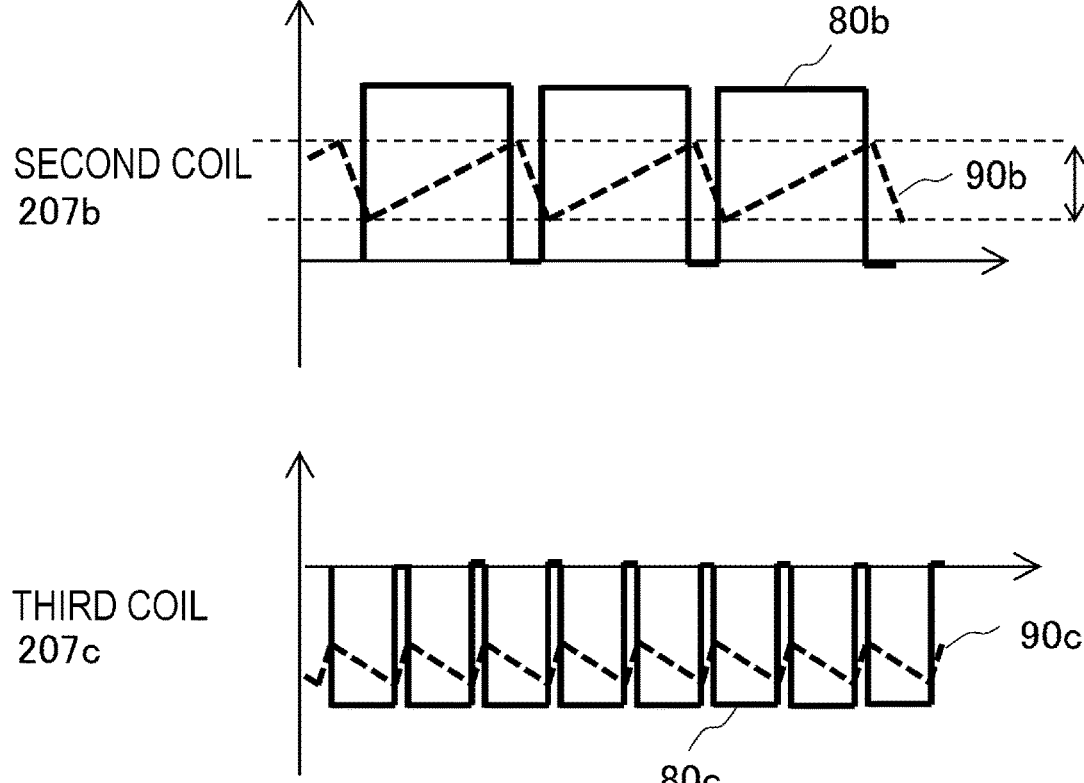
SECOND COIL
207b
80b
90b
THIRD COIL
207c
90c
80c

[FIG. 11]
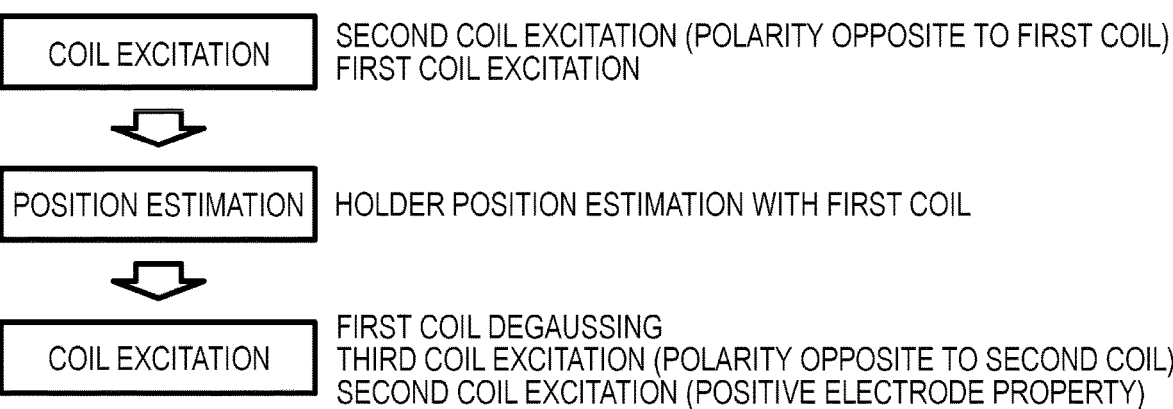
COIL EXCITATION    SECOND COIL EXCITATION (POLARITY OPPOSITE TO FIRST COIL)
FIRST COIL EXCITATION
POSITION ESTIMATION    HOLDER POSITION ESTIMATION WITH FIRST COIL
COIL EXCITATION    FIRST COIL DEGAUSSING
THIRD COIL EXCITATION (POLARITY OPPOSITE TO SECOND COIL)
SECOND COIL EXCITATION (POSITIVE ELECTRODE PROPERTY)
[FIG. 12]
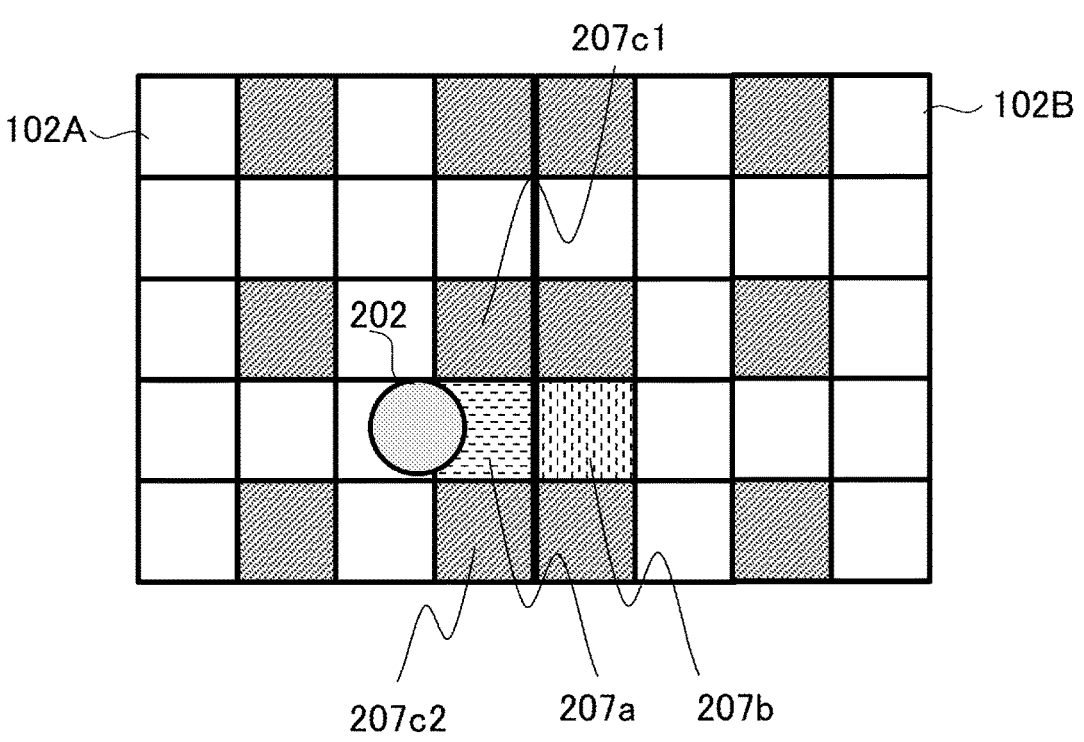

[FIG. 13]
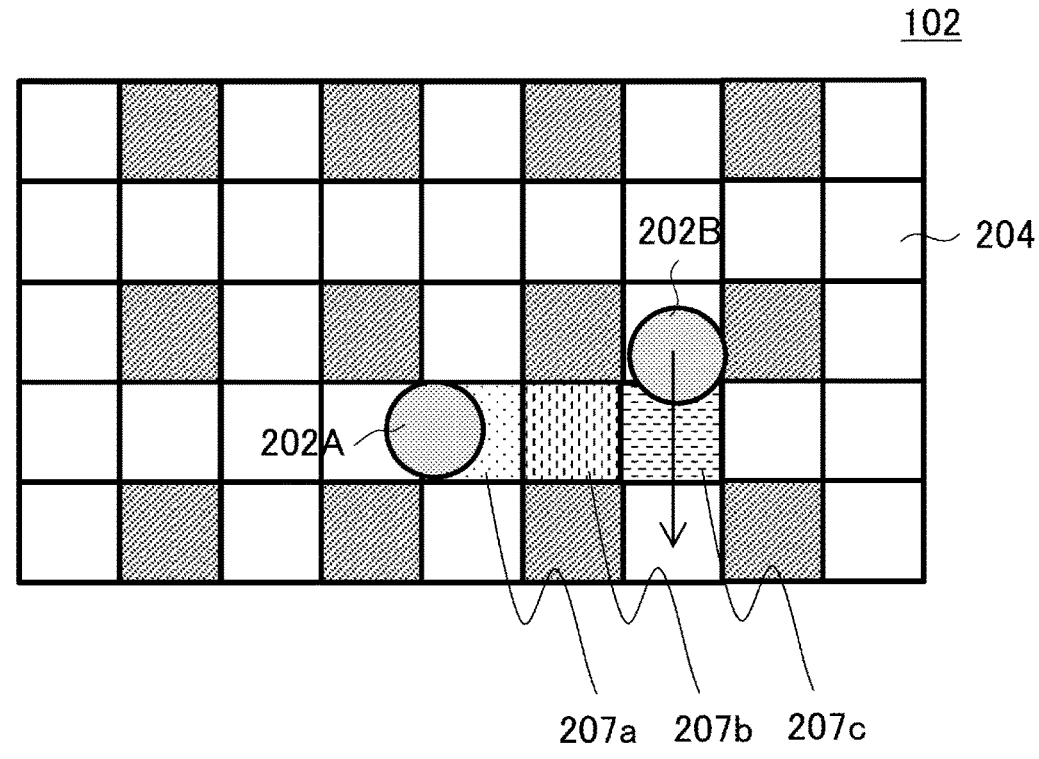
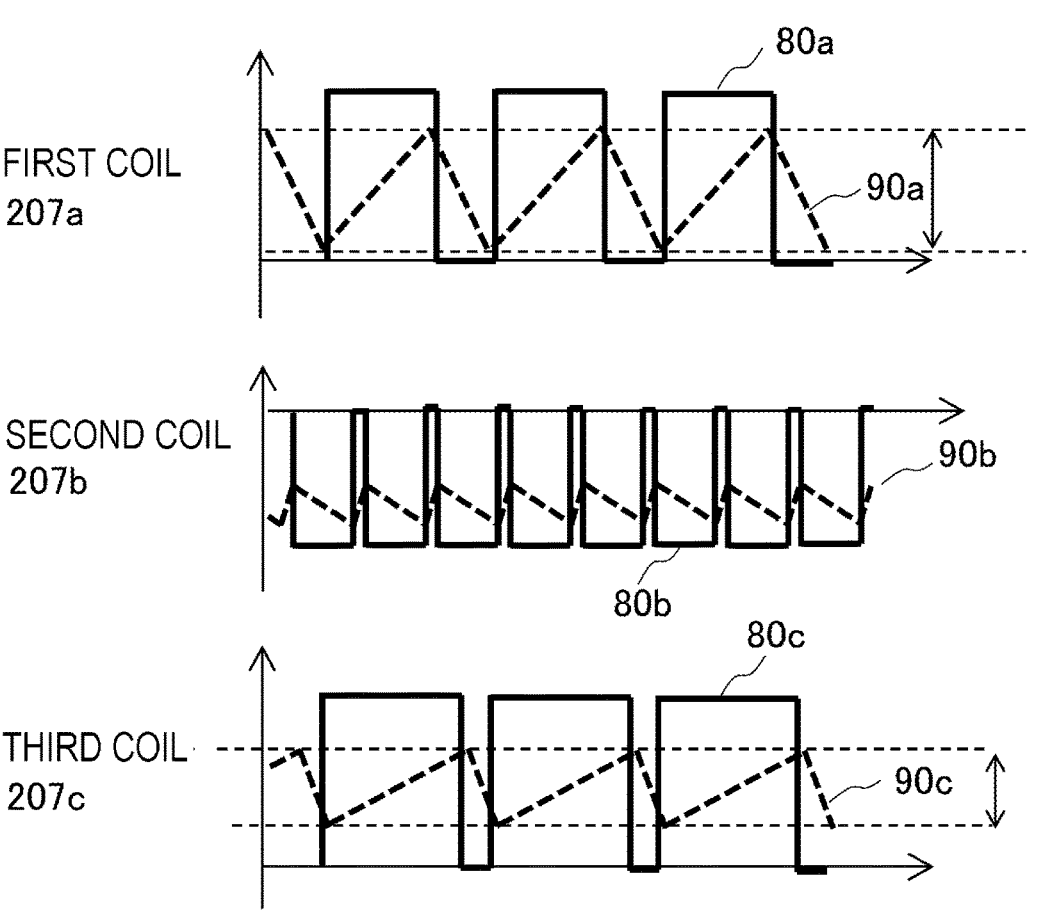

[FIG. 14]
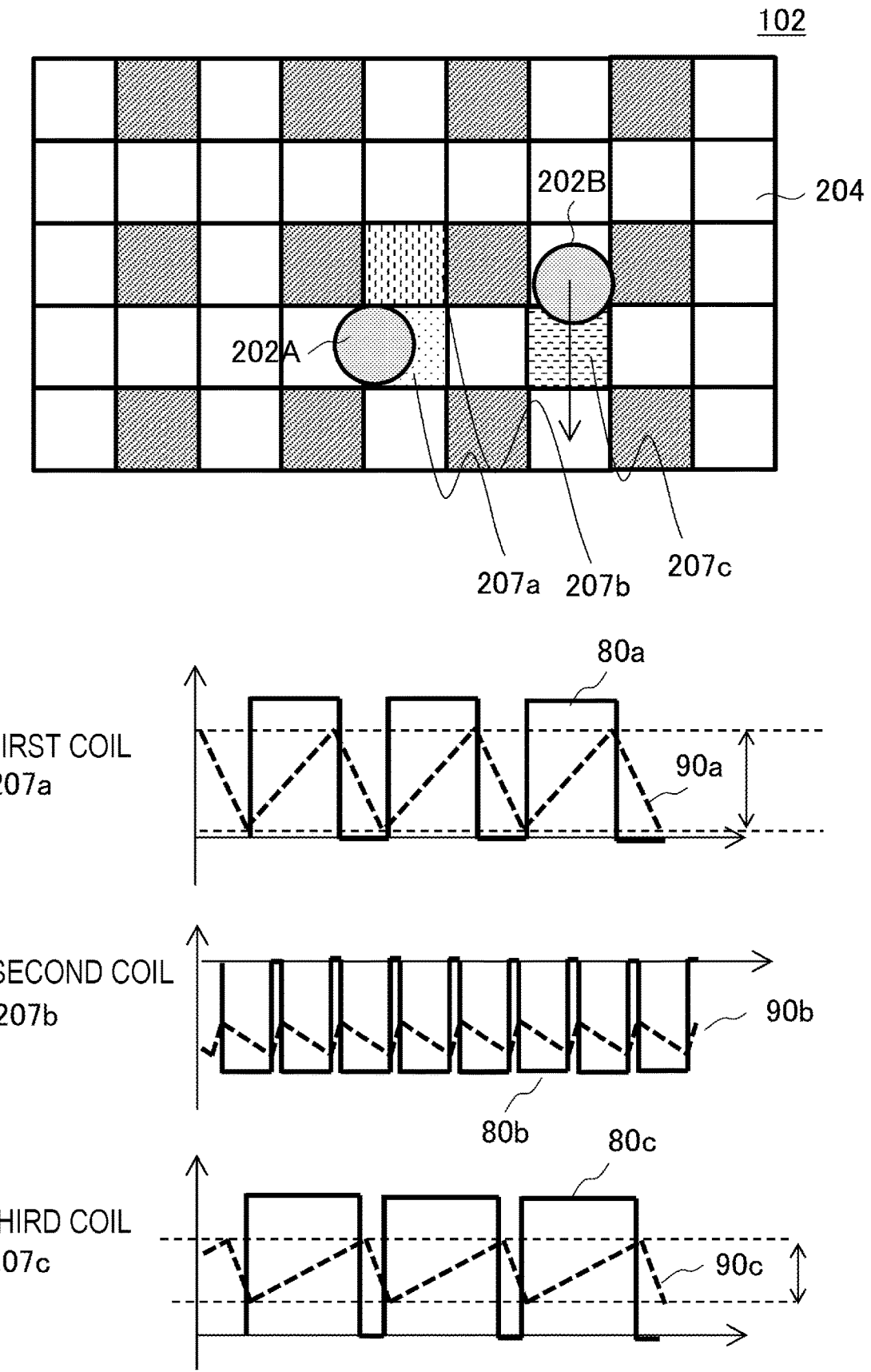

SAMPLE CONVEYANCE SYSTEM AND SAMPLE CONVEYANCE METHOD

TECHNICAL FIELD

The present invention relates to a sample conveyance system and a sample conveyance method in a sample analyzing device that analyzes a biological sample such as blood, plasma, serum, urine, and other body fluids (hereinafter, referred to as a sample), and a sample pretreatment device that performs a pretreatment for analysis.

BACKGROUND ART

PTL 1 discloses that a first magnetic material provided on a conveyed object side, a magnetic circuit including a core made of a second magnetic material and a winding wound around an outer periphery of the core, a drive circuit that supplies a current to the winding of the magnetic circuit, a current detection unit that detects a value of the current flowing through the winding, and a control unit that calculates a position of the first magnetic material based on the value of the current detected by the current detection unit and controls the current supplied from the drive circuit to the winding based on calculated position information of the first magnetic material are provided.

CITATION LIST

Patent Literature

PTL 1: JP2020-106354A

SUMMARY OF INVENTION

Technical Problem

As a sample treatment system for automatically analyzing a sample which is a biological sample such as blood or urine, there are a sample pretreatment system that performs charging, centrifugation, dispensing, labeling, and the like for a sample, and an automatic analysis system that analyzes a sample treated by such a sample pretreatment system.

In the related art, the sample pretreatment system or the automatic analysis system includes a sample conveyance line using a belt conveying device or the like in order to convey a sample to a mechanism that performs a predetermined treatment or analysis. By mounting a plurality of such conveyance lines on a sample conveyance system, a sample is conveyed to a predetermined mechanism.

In recent years, importance of sample analysis has increased due to advancement of medical care and aging of patients, and in order to improve an analysis processing capability of a sample analysis system, high-speed conveyance, mass conveyance, simultaneous conveyance, and conveyance in a plurality of directions for samples are desired.

As an example of a technique of achieving such conveyance, there is a conveyance method using an electromagnetic actuator.

Here, in the conveyance method using the electromagnetic actuator in the related art, a plurality of container carrier detection devices are required, and reliability may be lowered due to a device failure. Further, a space to place the detection device is required, and there is a limit to miniaturization.

To the contrary, in the conveyance method described in PTL 1, the position of the first magnetic material provided on the conveyed object side is calculated using the value of the current detected by the current detection unit. Therefore, since the conveyance method does not depend on the detection device, there is no problem that occurs in the related art.

However, as a result of intensive studies by the present inventors, it is clear that the technique described in PTL 1 may be influenced by a temperature change, an electromagnetic noise, a variation in hardware characteristics, and the like, and thus accuracy of the position information and a conveyance operation for the sample may be influenced, and there is room for improvement.

The invention solves the problems in the related art described above and provides a sample conveyance system and a sample conveyance method capable of conveying a sample in a more stable manner than that in the related art corresponding to a conveyance method using an electromagnetic actuator.

Solution to Problem

The invention includes a plurality of systems for solving the above problems, and an example thereof is a sample conveyance system that conveys a conveying container provided with a magnetic material, on which a sample container containing a sample is configured to be mounted, by attracting or repelling the conveying container by an electromagnetic force. The system includes: a plurality of magnetic poles having cores and windings wound around an outer circumferential side of the cores; a driving unit that applies a voltage to each of the windings of the plurality of magnetic poles; a current detection unit that detects a value of a current flowing through the winding; and a position detection unit that estimates a position of the conveying container based on the value of the current detected by the current detection unit. The driving unit applies a first voltage to a first magnetic pole located in a front side in a traveling direction of the conveying container, which is selected to attract or repel the conveying container, to excite the first magnetic pole, and applies a second voltage having a polarity opposite to a polarity of the first voltage to at least one or more of second magnetic poles among the magnetic poles adjacent to the first magnetic poles except for the magnetic poles in the front side in the traveling direction to excite the second magnetic poles, and the position detection unit estimates the position of the conveying container based on the value of the current flowing through the winding of the first magnetic pole.

Advantageous Effects of Invention

According to the invention, it is possible to convey a sample in a more stable manner than that in the related art corresponding to a conveyance method using an electromagnetic actuator. Problems, configurations, and effects other than those described above will be further clarified with the following description of embodiments.

BRIEF DESCRIPTION OF DRAWINGS

FIG. 1 is a schematic plan view illustrating an overall configuration of a sample conveyance system of Embodiment 1 of the invention.

Figure 2:
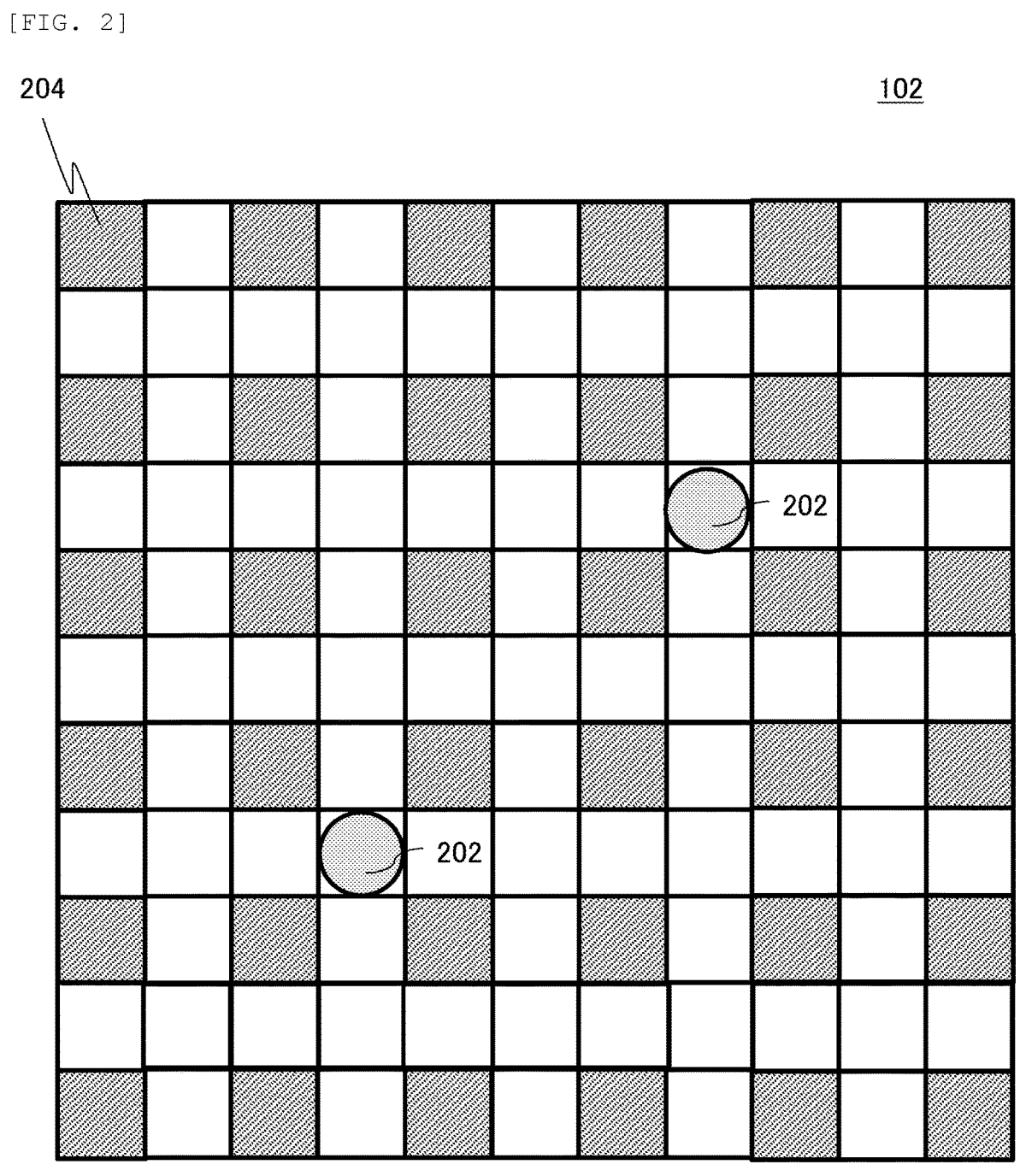

FIG. 2 is a top view illustrating a conveyance path on a conveying surface in a conveying device of Embodiment 1.

FIG. 3 is a side sectional view illustrating a schematic configuration of the conveying device of Embodiment 1.

FIG. 4 is a waveform diagram illustrating a voltage waveform applied to a coil by the conveying device of Embodiment 1 to detect a position of a holder and a current waveform corresponding thereto.

FIG. 5 is a graph illustrating a relationship between a distance between a magnetic pole and a holder (horizontal axis) and a current amplitude (vertical axis) when adjacent magnetic poles are excited.

FIG. 6 is a waveform diagram illustrating an example of a voltage and a current of a first coil and a voltage and a current having opposite characteristics of a second coil.

FIG. 7 is a graph illustrating a relationship between the distance between the magnetic pole and the holder (horizontal axis) and the current amplitude (vertical axis) when adjacent magnetic poles are excited.

FIG. 8 is a diagram illustrating an example of a coil excitation method for estimating a position of the holder when the holder is conveyed in the conveying device of Embodiment 1.

FIG. 9 is a diagram illustrating an example of the coil excitation method for estimating the position of the holder when the holder is conveyed in the conveying device of Embodiment 1.

FIG. 10 is a diagram illustrating an example of the coil excitation method for estimating the position of the holder when the holder is conveyed in the conveying device of Embodiment 1.

FIG. 11 is a flowchart illustrating an operation example of the conveying device of Embodiment 1.

FIG. 12 is a diagram illustrating an example of a coil excitation method for estimating a position of a holder when the holder is conveyed in a conveying device of Embodiment 2 of the invention.

FIG. 13 is a diagram illustrating an example of a coil excitation method for estimating a position of a holder when the holder is conveyed in a conveying device of Embodiment 3 of the invention.

FIG. 14 is a diagram illustrating an example of the coil excitation method for estimating the position of the holder when the holder is conveyed in the conveying device of Embodiment 3.

DESCRIPTION OF EMBODIMENTS

Hereinafter, a sample conveyance system and a sample conveyance method according to embodiments of the invention will be described with reference to the drawings.

In the drawings used in the present description, the same or corresponding components are denoted by the same or similar reference numerals, and repeated descriptions of these components may be omitted. Further, it is needless to say that the components (including element steps or the like) are not necessarily essential unless otherwise particularly specified or considered to be obviously essential in principle.

Embodiment 1

A sample conveyance system and a sample conveyance method according to Embodiment 1 of the invention will be described with reference to FIG. 1 to FIG. 11.

First, an overall configuration of the sample conveyance system will be described with reference to FIG. 1. FIG. 1 is a plan view illustrating an overall configuration of a sample conveyance system 100 according to Embodiment 1 of the invention.

The sample conveyance system 100 according to Embodiment 1 illustrated in FIG. 1 is a system provided with an analyzing device for automatically analyzing components of a sample such as blood or urine.

Main components of the sample conveyance system 100 are a plurality of (12 in FIG. 1) conveying devices 102 that convey holders 202 (see FIG. 2) on which sample containers 201 (see FIG. 2) containing samples such as blood or urine are mounted or empty holders, a plurality of (4 in FIG. 1) analyzing devices 103, and a control computer 101 that integrally manages the sample conveyance system 100.

The analyzing device 103 is a unit for performing qualitative and quantitative analysis on components of a sample conveyed by the conveying device 102. Analysis items in this unit are not particularly limited, and a configuration of a known automatic analyzing device that analyzes biochemical items and immune items may be employed. Further, when a plurality of analyzing devices 103 are provided, the analyzing devices 130 may have the same specification or different specifications, and are not particularly limited.

Each of the conveying devices 102 is a device that conveys a sample mounted in the holder 202 to a destination by sliding on a conveyance path by interaction between a magnetic material 203 (see FIG. 2) provided in the holder 202 and a coil 207 (see FIG. 2). Details thereof will be described in detail with reference to FIG. 2 and the subsequent drawings.

The control computer 101 controls an operation of the entire system including the conveying devices 102 and the analyzing devices 103, and is implemented by a computer including a display device such as a liquid crystal display, an input device, a storage device, a CPU, a memory, and the like. Control of the operation of each device by the control computer 101 is executed based on various programs recorded in the storage device.

Operation control processes executed by the control computer 101 may be integrated into one program, may be divided into a plurality of programs, or may be a combination thereof. Further, a part or all of the programs may be implemented by dedicated hardware, or may be modularized.

In FIG. 1 described above, a case in which four analyzing devices 103 are provided is described. However, the number of the analyzing devices is not particularly limited and may be one or more. Similarly, the number of the conveying devices 102 is not particularly limited and may be one or more.

Further, the sample conveyance system 100 can be provided with various sample pretreatment and post treatment units that perform a pretreatment and a post treatment on a sample. Detailed configurations of the sample pretreatment and post treatment units are not particularly limited, and a configuration of a known pretreatment device may be employed. In this case, it is not necessary to provide the analyzing device 103 as long as a destination for conveying the holder 202 is present.

Next, a specific configuration and an operation method of the conveying device 102 according to the present embodiment will be described with reference to FIG. 2 to FIG. 11.

Figure 3:
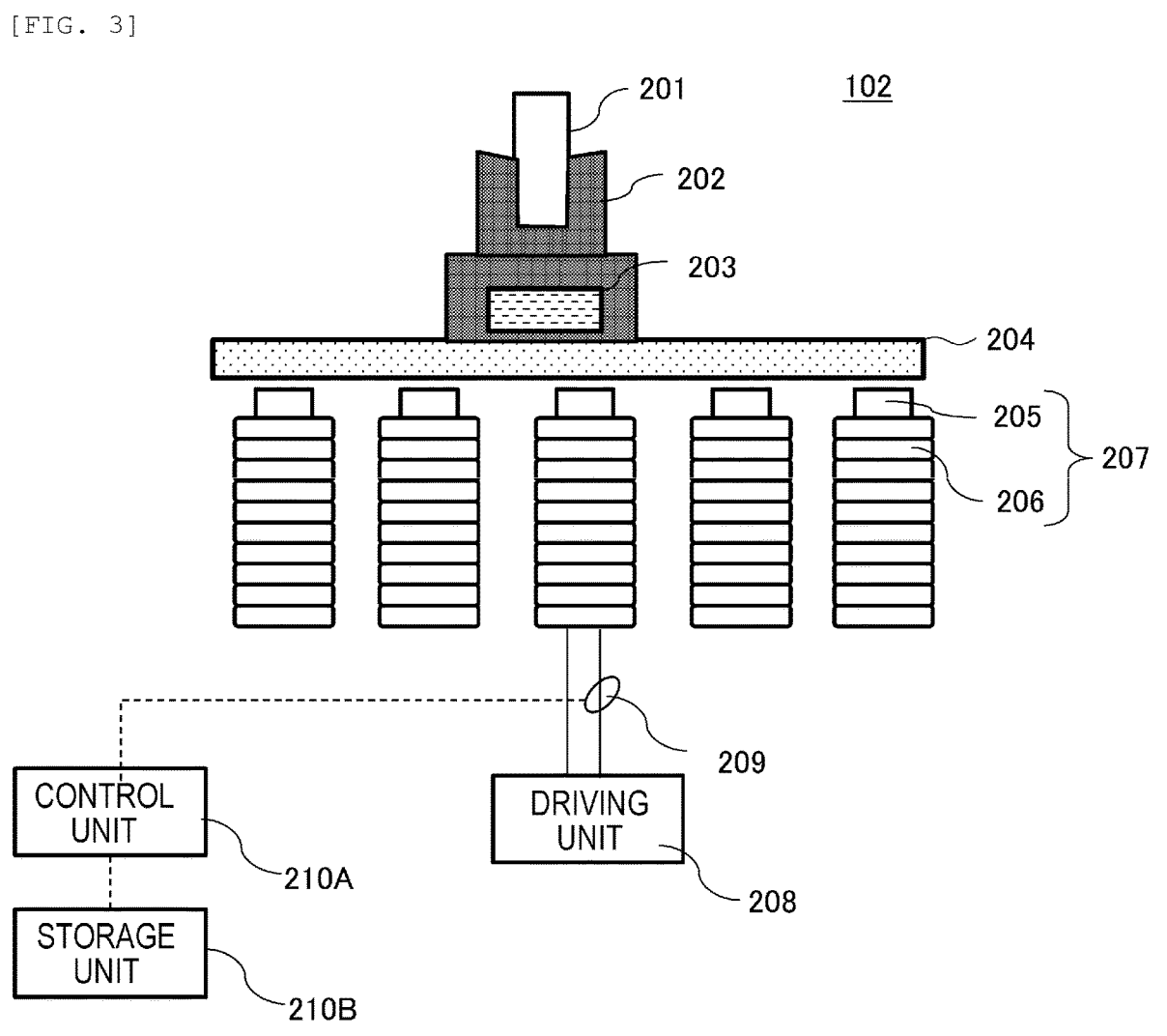

FIG. 2 is a top view illustrating a conveyance path on a conveying surface in a conveying device of Embodiment 1. FIG. 3 is a side sectional view illustrating a schematic configuration of the conveying device. FIG. 4 is a waveform diagram illustrating a voltage waveform applied to a coil by the conveying device to detect a position of a holder and a current waveform corresponding thereto. FIG. 5 is a graph illustrating a relationship between a distance between a magnetic pole and a holder (horizontal axis) and a current amplitude (vertical axis) when adjacent magnetic poles are excited. FIG. 6 is a waveform diagram illustrating an example of a voltage and a current of a first coil and a voltage and a current having opposite characteristics of a second coil. FIG. 7 is a graph illustrating a relationship between the distance between the magnetic pole and the holder (horizontal axis) and the current amplitude (vertical axis) when adjacent magnetic poles are excited. FIG. 8 to FIG. 10 are each a diagram illustrating an example of a coil excitation method for estimating a position of the holder when the holder is conveyed in the conveying device. FIG. 11 is a flowchart illustrating an operation example of the conveying device.

As illustrated in FIG. 2, in each of the conveying devices 102, the coils 207 are arranged in a grid pattern of five rows and five columns to form a conveyance path. A plurality of holders 202 on which the sample containers 201 containing the samples are installed are provided on a conveying surface 204. The number of grids is not limited to 5×5.

Further, as illustrated in FIG. 3, the conveying device 102 includes the conveying surface 204, the coil 207, a driving unit 208, a current detection unit 209, a control unit 210A, a storage unit 210B, and the like.

In FIG. 3, the holder 202 on which the sample container 201 containing the sample is installed is provided in plural in the conveying device 102. The magnetic material 203 is provided on a bottom surface portion of each of the plurality of holders 202.

The magnetic material 203 is formed of, for example, a permanent magnet such as neodymium or ferrite. The magnetic material 203 can also be formed of other magnets and soft magnetic bodies, and can be formed of an appropriate combination thereof.

Although it is not necessary to provide the magnetic material 203 on a lower surface of the holder 202, it is desirable to provide the magnetic material 203 on the lower surface of the holder 202 from a viewpoint of efficiently applying a conveyance force for electromagnetic conveyance.

The holder 202 including the magnetic material 203 moves to slide on the conveying surface 204. In order to generate the conveyance force, a plurality of coils 207 each including a cylindrical core 205 and a winding 206 wound around an outer periphery of the core 205 are provided below the conveying surface 204. The coil 207 constitutes each of a plurality of detection points for detecting a position of the magnetic material 203. Further, a plurality of conveyance paths are provided above the coil 207 so as to cover the coil 207.

The plurality of coils 207 provided in the conveying device 102 according to the present embodiment serve to detect the position of the magnetic material 203 and serve to convey the magnetic material 203, that is, convey the sample.

Further, in the present embodiment, specifications of the coils 207 in the conveying device 102 are the same for all the coils 207. However, the specifications are not necessarily the same, and a shape and a material of the core 205, the number of turns of the winding 206, and the like can be appropriately changed.

The winding 206 of the coil 207 is connected to the driving unit 208 that applies a predetermined voltage to the coil 207 to cause a predetermined current to flow through the winding 206. The coil 207 to which the voltage is applied by the driving unit 208 acts as an electromagnetic stone, and attracts the magnetic material 203 in the holder 202 on the conveying surface 204. After the holder 202 is attracted by the coil 207, application of the voltage to the coil 207 is stopped by the driving unit 208, and a voltage is applied by the driving unit 208 to a different coil 207 adjacent to the coil 207 in the same manner as described above, and thus the magnetic material 203 in the holder 202 is attracted to the adjacent coil 207.

By repeating this procedure for all the coils 207 constituting the conveyance path, the sample contained in the sample container 201 held by the holder 202 provided with the magnetic material 203 is conveyed to the destination.

Further, each of these coils 207 serves to detect the position of the magnetic material 203, in addition to convey the magnetic material 203, that is, convey the sample.

In general, when a voltage is applied to the winding 206 (or the coil 207) to cause a current to flow, a magnetic field is generated around the winding 206 (or the coil 207), and a generated magnetic flux is proportional to a value of the flowing current. This proportional constant is called inductance.

When the holder 202 is located near the coil 207, a magnetic flux (a magnetic field) generated by the magnetic material 203 is generated in the core 205. Therefore, the magnetic flux (the magnetic field) generated by the magnetic material 203 and the magnetic flux (the magnetic field) generated by the current flowing through the winding 206 are generated in the core 205. In particular, a magnitude of the magnetic flux generated in the core 205 changes depending on a relative position between the magnetic material 203 and the coil 207.

On the other hand, the core 205 is made of a magnetic material, and a magnetic flux passing through the core 205 has a property of being difficult to pass as the magnetic flux increases. This property is known as magnetic saturation.

Therefore, in a magnetic circuit including a magnetic material such as the core 205, when the magnetic flux generated in the core 205 increases and saturation in the core 205 occurs, the inductance decreases. That is, when the magnetic field from the magnetic material 203 increases and magnetic saturation occurs in the core 205, a magnetic permeability decreases, and thus a change occurs in the current flowing through the winding 206 (the coil 207).

FIG. 4 is a waveform diagram illustrating a voltage waveform 60 applied to the winding 206 (the coil 207) by the conveying device 102 to detect a position of the holder 202 and a current waveform 70 corresponding thereto. When the magnetic material 203 in the holder 202 approaches the coil 207, the magnetic saturation in the core 205 changes a current waveform 70a in an upper side in FIG. 4 to a current waveform 70b in a lower side in FIG. 4.

That is, when the coil 207 is not influenced by the magnetic material 203 in the holder 202, the current amplitude is as illustrated in the upper side in FIG. 4. On the other hand, for example, when the coil 207 is influenced by the magnetic material 203 in the holder 202 as in a case in which the magnetic material 203 is directly above or in a vicinity of the coil 207, the current amplitude is larger than that in the upper side in FIG. 4, as illustrated in the lower side in FIG. 4.

Therefore, the current detection unit 209 detects the current flowing through the winding 206 (the coil 207), and the control unit 210A estimates the position of the holder 202 using the value of the current. For example, the position of the holder 202 can be estimated by the current detection unit 209 detecting an amplitude value of the current waveform (an amount of change in the current at rise/fall of a position detection pulse).

A pulse magnitude and a pulse width of the voltage waveform 60 may be variable or fixed. Further, the current detection unit 209 may be a series resistor, a unit based on a current transformer, a unit that uses a Hall-current sensor, or the like, but is not limited to these.

The storage unit 210B holds information 211 on a current amplitude depending on a distance between the coil 207 and the holder 202, which indicates a relationship between an amplitude of a current flowing through a first coil 207a and a distance between the first coil 207a and the holder 202 when a second coil 207b is excited, as illustrated in FIG. 5. The control unit 210A estimates the position of the holder 202 with reference to the information 211 on the current amplitude held in the storage unit 210B based on a command from the control computer 101.

A position detection process may be executed by the control unit 210A or may be executed by the control computer 101. In the present embodiment, the control computer 101 determines various settings during position detection, and the control unit 210A executes the settings.

Further, the control unit 210A calculates a current flowing through each winding 206 (coil 207) using various pieces of information such as position information, speed information, and weight information on the holder 202, and outputs a command signal to each driving unit 208. The driving unit 208 applies a voltage to the corresponding winding 206 based on the command signal.

The information 211 on the relationship of the current amplitude depending on the distance between the coil 207 and the holder 202 held in the storage unit 210B as illustrated in FIG. 5 depends on a condition of the voltage applied to the winding 206 (the coil 207), such as the pulse magnitude, the pulse width, and a duty of the voltage waveform 60. Since this voltage condition depends on a driving condition such as a thrust force applied to the holder 202, various values can be taken.

Therefore, it is desirable to hold a plurality of pieces of information 211 on the relationship of the current amplitude depending on the distance between the coil 207 and the holder 202 in FIG. 5 for each of various voltage conditions that may be used. Further, it is possible to select an appropriate relationship according to the driving condition of the holder 202 and use the relationship for estimating the position of the holder 202.

Further, in the invention, in order to increase detection sensitivity (estimation accuracy) for the position of the holder 202 during the conveyance of the holder 202, the driving unit 208 applies a first voltage to the coil 207 (the first coil) located in a front side in a traveling direction of the holder 202, which is selected for applying the thrust force (an attraction force or a repulsion force) to the holder 202 to excite the coil 207, and applies a voltage of any voltage value having a polarity opposite to that of an excitation current of the first coil to the coil 207 immediately before the first coil (the second coil) in the traveling direction of the holder 202.

The second coil in this case is not limited to only the coil 207 immediately before the first coil in the traveling direction of the holder 202, and may be any one or more coils 207 adjacent to the first coil except for the coils 207 in the front side in the traveling direction.

Further, the first voltage may be applied for both conveyance and position detection of the holder 202, or may be applied exclusively for position detection, and is not particularly limited.

The current detection unit 209 detects a value of a current flowing through the winding 206 when the first voltage is applied to the coil 207 (the first coil), and the control unit 210A estimates a position of the holder 202 based on the value of the current flowing through the winding 206 of the coil 207 (the first coil).

FIG. 6 is a diagram illustrating an example of a voltage waveform 80a applied to the first coil and a current waveform 90a thereof, and a voltage waveform 80b applied to the second coil and a current waveform 90b thereof. As illustrated in FIG. 6, a state in which a voltage and a current of the second coil having opposite characteristics to those of the first coil are applied to the winding 206 (the coil 207) is illustrated.

Here, as the second voltage applied to the second coil by the driving unit 208, for example, a pulse voltage can be used, and any duty ratio can be employed. Although the current may not be a direct current, it is desirable that the duty ratio is substantially constant and an effective value is substantially constant.

As a result of exciting the second coil with a polarity opposite to that of the first coil, the core 205 of the first coil is in a state of being likely to cause magnetic saturation. This is because, when the second coil is excited with the opposite polarity, the magnetic flux generated in the core 205 of the first coil is generated in a direction in which the magnetic flux of the first coil itself is strengthened.

FIG. 7 is a graph illustrating a relationship between a distance between the first coil and the holder and a current amplitude when a pulse voltage is applied to the first coil and a voltage having a polarity opposite to that of the first coil is applied to the second coil adjacent to the first coil. Here, a dotted line 211a is a graph when the second coil is not excited, and a solid line 211b is a graph when the second coil is excited.

As illustrated in FIG. 7, when a predetermined pulse voltage is applied to the first coil in a state in which the second coil is excited with a polarity opposite to that of the excitation current of the first coil, the current amplitude when the holder 202 is located at a position away from the first coil by a predetermined distance as well as directly above the first coil is relatively increased, and the detection sensitivity (or the estimation accuracy) for the position of the holder 202 estimated based on the current amplitude of the first coil is improved.

In the invention, a predetermined pulse voltage is applied to the first coil in a state in which the second coil adjacent to the first coil in the traveling direction of the holder 202 in which the thrust force is generated is excited with an excitation current having a polarity opposite to that of the first coil. Thereafter, the distance between the first coil and the holder 202 is estimated based on a change in the current amplitude of the first coil. In the estimation, the solid line 211b illustrated in FIG. 7, which is information on the relationship between the distance between the first coil and the holder and the current amplitude in which the detection sensitivity is improved by excitation of the second coil, is used.

In this way, since the second coil adjacent to the first coil in the traveling direction of the holder 202 is excited, the detection sensitivity (the detection accuracy) for the position of the holder 202 can be improved without influencing the thrust force due to a distance away from the holder 202.

Hereinafter, an operation example of estimating the position of the holder 202 when the holder 202 is conveyed will be described with reference to FIG. 8 to FIG. 10. FIG. 8 to FIG. 10 are each a schematic diagram illustrating a coil excitation method for the coil 207 while the holder 202 is being conveyed. Each figure illustrates a top view of the conveying surface 204 and an outline of a voltage waveform and a current waveform of the coil 207. FIG. 11 is a flowchart illustrating the operation example in FIG. 8 to FIG. 10.

In FIG. 8, the first coil 207a located in the front side in the traveling direction of the holder 202 is excited to apply a thrust force to the holder 202. Further, the second coil 207b adjacent to the first coil 207a in the traveling direction of the holder 202 is excited with a polarity opposite to that of the first coil 207a. The second coil to which the second voltage is applied may be any one of coils 207c1 and 207c2 as well as the coil 207b. Further, two or more of these coils 207b, 207c1, and 207c2 may be provided.

FIG. 9 is a schematic diagram illustrating an arrangement when the holder 202 approaches the first coil 207a, the amplitude of the current flowing through the first coil 207a increases, and the position of the holder 202 is detected by the control unit 210A.

In the present embodiment, since the second coil 207b is excited with a polarity opposite to that of the first coil 207a, a change in the amplitude of the current flowing through the first coil 207a when the holder 202 approaches the first coil 207a is larger than that in the related art.

In this way, it is possible to prevent the accuracy of the position estimation and the conveyance operation for the sample from being influenced by a temperature change, an electromagnetic noise, and the like, and to convey the sample more stably than that in the related art.

It is desirable that a current waveform of the second coil 207b is stable before a current waveform of the first coil 207a is stabilized and the position of the holder 202 can be estimated. Further, it takes several milliseconds to several tens of milliseconds for the current waveform to stabilize after a voltage is applied to the winding 206 (or the coil 207).

Therefore, a timing at which the second coil 207b is excited is not particularly limited. However, it is desirable that the timing is substantially the same as a timing at which the first coil 207a is excited, or a predetermined timing, preferably 10 to 20 milliseconds before the timing at which the first coil 207a is excited.

The current flowing through the second coil 207b excited to the opposite polarity may be due to a pulse voltage or a current control, or may be a direct current. In a case of the pulse voltage, any magnitude, period, duty ratio, phase with respect to the pulse voltage applied to the first coil 207a, and the like of the voltage may be used. Further, the current may be controlled by software or hardware.

Further, it is desirable that the duty ratio of the pulse voltage is substantially constant or the current is controlled such that an effective value of the current of the second coil 207b excited to the opposite polarity is substantially constant. When the same pulse voltage control as that of the first voltage is performed, it is not necessary to change a control method, and implementation is easy.

After the holder 202 is detected based on the current value of the first coil 207a, the first coil 207a and the second coil 207b are demagnetized between FIG. 9 and FIG. 10. The timings of demagnetizing the first coil and the second coil need not be the same. Further, the polarity, the duty, the pulse width, and the like of the applied pulse voltage may be changed without explicitly providing a period in which the second coil 207b is demagnetized. At this time, the pulse voltage can be quickly changed according to an operation of the control unit 210A.

In FIG. 10, the second coil 207b (a new first coil) in the traveling direction of the holder 202 is excited by a pulse voltage having the voltage waveform 80b to apply a thrust force to the holder 202. Further, a third coil 207c (a new second coil) adjacent to the second coil 207b in the traveling direction of the holder 202 is excited by a pulse voltage having a voltage waveform 80c and a current waveform 90c having polarities opposite to those of the second coil 207b (the new first coil).

By continuing the operations illustrated in FIG. 8 to FIG. 10 in this manner, it is possible to convey the holder 202 while improving the sensitivity of the position estimation for the holder 202 as compared with that in the related art.

As described above, in the conveying device 102 in which the position of the holder 202 is estimated using the current flowing through the winding 206 (or the coil 207), the total number of the coils 207 to be excited is increased as compared with that in a case in the related art, but the detection sensitivity (or the detection accuracy) for the position of the holder 202 can be improved.

Next, effects of the present embodiment will be described.

In the sample conveyance system 100 according to Embodiment 1 of the invention described above, the driving unit 208 applies the first voltage to the first coil 207a located in the front side in the traveling direction of the holder 202, which is selected to attract or repel the holder 202, to excite the first coil 207a, and applies the second voltage having the polarity opposite to the polarity of the first voltage to at least one or more second coils 207b among the coils 207 except for the coils 207 in the front side in the traveling direction to excite the second coils 207b, and the control unit 210A estimates the position of the holder 202 based on the value of the current flowing through the winding 206 of the first coil 207a.

Accordingly, the change in the amplitude of the current flowing through the first coil 207a when the holder 202 approaches the first coil 207a can be made larger than that in the related art, an influence of a temperature change, an electromagnetic noise, a variation in hardware characteristics, and the like can be prevented as compared with that in the related art, and an influence on the accuracy of the position estimation and the conveyance operation for the sample can be reduced. Accordingly, even in a sample conveyance method using an electromagnetic actuator, the sample can be conveyed more stably than that in the related art, and a conveying device with higher reliability can be achieved.

Further, since the driving unit 208 makes the timing of applying the second voltage earlier than the timing of applying the first voltage by a predetermined timing, the current waveform of the second coil 207b can be in reliably stabilized state before the current waveform of the first coil 207a for estimating the position of the holder 202 is stabilized, and the position of the holder 202 can be estimated with higher accuracy.

Further, the driving unit 208 sequentially conveys the holder 202 to a target position by switching the first coil 207a, and switches the second coils 207b according to the switching of the first coil 207a, so that the holder 202 can be stably conveyed to the destination by highly accurate position detection.

Further, the driving unit 208 can further stabilize the second voltage by setting the second voltage to have a direct current or to a pulse voltage flowing in a direction opposite in polarity to the first voltage, and the position of the holder 202 can be estimated with higher accuracy.

Further, since the storage unit 210B that holds the relationship between the amplitude of the current flowing through the first coil 207a and the distance between the first coil 207a and the holder 202 when the second coil 207b is excited is further provided, in particular, the storage unit 210B holds the relationship between the amplitude of the current flowing through the first coil 207a and the distance between the first coil 207a and the holder 202 for each combination of the first voltage and the second voltage having different duties, which are pulse voltages, highly accurate position estimation corresponding to various driving conditions can be quickly performed.

Further, since the coils 207 are arranged in the grid pattern, flexible conveyance corresponding to various conveyance paths can be achieved.

Further, by setting the predetermined timing between 10 and 20 milliseconds, the current waveform of the first coil 207a can be stabilized in a state in which the current waveform of the second coil 207b is reliably stabilized, and the position of the holder 202 can be estimated with higher accuracy.

Embodiment 2

A sample conveyance system and a sample conveyance method according to Embodiment 2 of the invention will be described with reference to FIG. 12. FIG. 12 is a diagram illustrating an example of a coil excitation method for estimating a position of a holder when the holder is conveyed in a conveying device according to Embodiment 2.

As illustrated in FIG. 12, in the sample conveyance system 100 and the sample conveyance method according to Embodiment 2, control in a case in which the position of the holder 202 is estimated when the holder 202 crosses between the conveying devices 102 will be described.

In the coil 207 at an end of the conveying device 102, there is a problem that a change (a slope) of its current amplitude is reduced in the information 211 on the relationship between the distance between the coil 207 and the holder 202 and the current amplitude illustrated in FIG. 5.

Therefore, in the present embodiment, the driving unit 208 determines whether to apply the second voltage when a position of the coil 207 used to estimate the position of the holder 202 is located at the end of the conveying device 102, and applies the second voltage to the second coil 207b according to presence or absence of determined application of the second voltage.

That is, in Embodiment 2, when the position of the holder 202 is estimated based on the current value of the first coil 207a in the coils 207a located at the end of a conveying device 102A, the second coil 207b of a conveying device 102B adjacent to the first coil 207a in the traveling direction of the holder 202 is excited with a polarity opposite to that of the first coil 207a. Therefore, when the holder 202 approaches the first coil 207a, the change in the amplitude of the current flowing through the first coil 207a is larger than that in the related art.

In FIG. 12, the first coil 207a located in the front side in the traveling direction of the holder 202 is excited to apply a thrust force to the holder 202. Further, the second coil 207b adjacent to the first coil 207a in the traveling direction of the holder 202 is excited with a polarity opposite to that of the first coil 207a. The second coil to which the second voltage is applied may be any one of the coils 207c1 and 207c2 as well as the coil 207b. Further, two or more of these coils 207b, 207c1, and 207c2 may be provided.

As described above, according to the present embodiment, it is possible to provide a sample conveyance system and a sample conveyance method capable of conveying a sample more stably than that in the related art in the coil 207 at the end of the conveying device 102 in which the sensitivity of position detection for the holder 202 and the conveyance operation for the sample may be influenced.

Other configurations and operations are substantially the same as those of the sample conveyance system and the sample conveyance method according to Embodiment 1 described above, and detailed description thereof will be omitted.

Embodiment 3

A sample conveyance system and a sample conveyance method according to Embodiment 3 of the invention will be described with reference to FIG. 13 and FIG. 14. FIG. 13 and FIG. 14 are each a diagram illustrating an example of a coil excitation method for estimating a position of a holder when the holder is conveyed in a conveying device according to Embodiment 3.

The sample conveyance system 100 and the sample conveyance method according to Embodiment 3 are suitable for estimating the position of the holder 202 when the holder 202 is stopped.

In FIG. 13, there are two holders 202A and 202B on the conveying surface 204 of the conveying device 102, and the holder 202A is immediately before stopping at a grid point of the coils 207 arranged in the grid pattern. The holder 202B is being conveyed in a direction perpendicular to the holder 202A. The grid point of the coils 207 arranged in the grid pattern is a stop position of the holder 202.

At this time, in a case in which the second coil 207b adjacent to the first coil 207a in the traveling direction of the holder 202A is excited with a polarity opposite to that of the first coil 207a, when the third coil 207c adjacent to the second coil 207b is excited in order to detect a position of the holder 202B being conveyed, a change in the amplitude of the current is larger than that in the related art.

In such a case, the information 211 on the relationship between the distance between the third coil 207c and the holder and the current amplitude when the adjacent second coil 207b is excited to the opposite polarity at a predetermined duty (see FIG. 7) is held in advance in the storage unit 210B, and can be used at the time of estimating the position of the holder 202B using the third coil 207c.

That is, in a case of estimating the position of the holder 202B using the third coil 207c, when the coils 207 on left and right of the third coil 207c with respect to the traveling direction of the holder 202B are excited with opposite polarities, the relationship between the holder position and the current amplitude appropriate for such a situation is held in advance and used for the position estimation for the holder 202. Accordingly, even in a case in which the position of the holder 202A is estimated when the holder 202A is stopped, the adjacent coils 207 can be excited with opposite polarities and used to improve the sensitivity of the position estimation.

Further, alternatively, as illustrated in FIG. 14, when the holder 202 is stopped, the stop position of the holder 202 is a grid point of the coils 207 arranged in the grid pattern, and thus, at the stop position of the holder 202, adjacent coils 207 are present not only in the traveling direction of the holder 202A but also on the left and right. By exciting at least one second coil 207b among them with opposite polarities, the second coils 207b can be used to improve the sensitivity of position estimation based on the current amplitude of the first coil 207a.

In this case, the position estimation for the holder 202B using the third coil 207c can employ a method in the related art, the method according to any one of Embodiment 1 and Embodiment 2, and the method described in the present embodiment.

Other configurations and operations are substantially the same as those of the sample conveyance system and the sample conveyance method according to Embodiment 1 described above, and detailed description thereof will be omitted.

The sample conveyance system and the sample conveyance method according to Embodiment 3 of the invention can also achieve substantially the same effects as those of the sample conveyance system and the sample conveyance method according to Embodiment 1 described above.

<Others>

The invention is not limited to the above embodiments, and includes various modifications. The above embodiments have been described in detail for easy understanding of the invention, and the invention is not necessarily limited to those including all the configurations described above.

Further, a part of configurations of one embodiment can be replaced with configurations of another embodiment, and configurations of one embodiment can be added to configurations of another embodiment. A part of configurations of each embodiment may be added, deleted, or replaced with another configuration.

REFERENCE SIGNS LIST 60, 80*a*, 80*b*, 80*c*: voltage waveform
70, 70*a*, 70*b*, 90*a*, 90*b*, 90*c*: current waveform
100: sample conveyance system
101: control computer
102, 102A, 102B: conveying device
103: analyzing device
201: sample container
202, 202A, 202B: holder (conveying container)
203: magnetic material
204: conveying surface
205: core
206: winding
207, 207*a*, 207*b*, 207*c*, 207*c*1, 207*c*2: coil (first magnetic pole, second magnetic pole)
208: driving unit
209: current detection unit
210A: control unit (position detection unit)
210B: storage unit
211: information on relationship between distance between magnetic pole and holder and current amplitude
211*a*: dotted line
211*b*: solid line

The invention claimed is:

1. A sample conveyance system that conveys a conveying container provided with a magnetic material, on which a sample container containing a sample is configured to be mounted, by attracting or repelling the conveying container by an electromagnetic force, the system comprising:
   at least a first conveying device and a second conveying device, each of which includes:
   a plurality of magnetic poles having cores and windings wound around an outer circumferential side of the cores;
   a driving unit that applies a voltage to each of the windings of the plurality of magnetic poles;
   a current detection unit that detects a value of a current flowing through the winding; and a position detection unit that estimates a position of the conveying container based on the value of the current detected by the current detection unit, wherein
   the driving unit
   applies a first voltage to a first magnetic pole located in a traveling direction of the conveying container, which is selected to attract or repel the conveying container, to excite the first magnetic pole, and
   applies a second voltage having a polarity opposite to a polarity of the first voltage to at least one or more of second magnetic poles among the magnetic poles adjacent to the first magnetic pole except for the magnetic poles on a conveying container side with respect to the first magnetic pole in the traveling direction to excite the second magnetic poles, and
   the position detection unit estimates the position of the conveying container based on the value of the current flowing through the winding of the first magnetic pole,
   wherein, when the position detection unit of the first conveying device estimates the position of the conveying container to be at an end of the first conveying device adjacent to the second conveying device in the traveling direction based on the current flowing in the first magnetic pole at the end of the first conveying device, the driving unit of the second conveying device is adapted to apply the second voltage to a second magnetic pole of the second conveying device adjacent to the first magnetic pole of the first conveying device in the traveling direction.

2. The sample conveyance system according to claim 1, wherein the driving unit sets a timing of applying the second voltage earlier than a timing of applying the first voltage by a predetermined timing.

3. The sample conveyance system according to claim 2, wherein the predetermined timing is set between 10 and 20 milliseconds.

4. The sample conveyance system according to claim 1, wherein
   the driving unit
   sequentially conveys the conveying container to a target position by switching the first magnetic pole, and
   switches the second magnetic poles according to the switching of the first magnetic pole.

5. The sample conveyance system according to claim 1, wherein the driving unit uses the second voltage as a direct current or a pulse voltage flowing in a direction opposite in polarity to the first voltage.

6. The sample conveyance system according to claim 1, further comprising:
   a storage unit that stores a relationship between an amplitude of a current flowing through the first magnetic pole and a distance between the first magnetic pole and the conveying container when the second magnetic pole is excited.

7. The sample conveyance system according to claim 5, wherein the storage unit stores a relationship between the amplitude of the current flowing through the first magnetic pole and the distance between the first magnetic pole and the conveying container for each combination of the first voltage and the second voltage having different duties, which are pulse voltages.

8. The sample conveyance system according to claim 1, wherein
   when conveying the conveying container, the driving unit applies the second voltage to the second magnetic pole when a specific first voltage is applied.

9. The sample conveyance system according to claim 1, wherein the magnetic poles are arranged in a grid pattern.

10. A sample conveyance method for conveying a sample container, containing a sample and mounted on a conveying container provided with a magnetic material by at least a first conveying device and a second conveying device, the method comprising:

applying a first voltage to a first magnetic pole located in a traveling direction of the conveying container, which is selected to attract or repel the conveying container, among a plurality of magnetic poles having cores and windings wound around an outer circumferential side of the cores, to excite the first magnetic pole;

applying a second voltage having a polarity opposite to a polarity of the first voltage to at least one or more of second magnetic poles among the magnetic poles adjacent to the first magnetic pole except for the magnetic poles on a conveying container side with respect to the first magnetic pole in the traveling direction to excite the second magnetic poles; and estimating a position of the conveying container based on a value of a current flowing through the winding of the first magnetic pole;

wherein, when the position of the conveying container is estimated to be at an end of the first conveying device adjacent to the second conveying device in the traveling direction based on the current flowing in the first magnetic pole at the end of the first conveying device, the second voltage is applied to a second magnetic pole of the second conveying device adjacent to the first magnetic pole of the first conveying device in the traveling direction.

* * * * *